US007390183B2

(12) United States Patent
Hinzmann

(10) Patent No.: US 7,390,183 B2
(45) Date of Patent: Jun. 24, 2008

(54) TOOL RIG FOR THE COMPACTION OF PARTICULATE MATERIAL

(75) Inventor: Gerd Hinzmann, Oakville (CA)

(73) Assignee: NetShape Technologies, Inc., Sellersburg, IN (US)

(*) Notice: Subject to any disclaimer, the term of this patent is extended or adjusted under 35 U.S.C. 154(b) by 189 days.

(21) Appl. No.: 10/501,297

(22) PCT Filed: Jan. 13, 2003

(86) PCT No.: PCT/US03/00847

§ 371 (c)(1),
(2), (4) Date: Jul. 12, 2004

(87) PCT Pub. No.: WO03/059608

PCT Pub. Date: Jul. 24, 2003

(65) Prior Publication Data

US 2005/0175729 A1 Aug. 11, 2005

Related U.S. Application Data

(60) Provisional application No. 60/348,972, filed on Jan. 15, 2002.

(51) Int. Cl.
*B29C 43/42* (2006.01)

(52) U.S. Cl. .......................... 425/78; 425/171; 425/351; 425/577; 425/810

(58) Field of Classification Search .................. 425/78, 425/574, 575–577, 589–595, 162, 171, 348–351, 425/810, DIG. 58, 556
See application file for complete search history.

(56) References Cited

U.S. PATENT DOCUMENTS

| | | | | |
|---|---|---|---|---|
| 2,509,783 | A | 5/1950 | Richardson | |
| 2,562,876 | A * | 8/1951 | Baeza | 425/354 |
| 4,085,178 | A * | 4/1978 | McNeely et al. | 425/810 |
| 4,482,307 | A | 11/1984 | Schaidl et al. | |
| 4,772,196 | A * | 9/1988 | Asai | 425/577 |
| 4,971,548 | A * | 11/1990 | Asai | 425/588 |
| 5,238,375 | A | 8/1993 | Hirai | |
| 5,320,517 | A * | 6/1994 | Hirata et al. | 425/589 |
| 5,551,856 | A | 9/1996 | Katagiri | |
| 6,468,449 | B1 * | 10/2002 | Fujikawa | 425/595 |

FOREIGN PATENT DOCUMENTS

| | | |
|---|---|---|
| DE | 40 03 016 A1 | 8/1991 |
| EP | 0 586 028 B1 | 5/1996 |
| FR | 1 424 583 | 1/1966 |
| WO | WO 01/08864 A1 | 2/2001 |

OTHER PUBLICATIONS

Patent Abstracts of Japan, vol. 1998, No. 3 (Japan Patent Publication No. 09295196, Published Nov. 18, 1997).
International Search Report corresponding to International Application No. PCT/US03/00847, 2003.

* cited by examiner

*Primary Examiner*—Tim Heitbrink
*Assistant Examiner*—Thu Khanh T. Nguyen
(74) *Attorney, Agent, or Firm*—Fay Sharpe LLP

(57) ABSTRACT

A tool rig for the compaction of particulate materials includes a base and a cylinder block disposed on the base. At least two pistons are disposed within the cylinder block and one piston is at least partially disposed within one other piston. A supply component is disposed in the inner diameter of at least one of the pistons and defines at least one channel. The channel connects an energy supply to at least one of the pistons.

29 Claims, 7 Drawing Sheets

TOOL RIG FOR THE COMPACTION OF PARTICULATE MATERIAL

CROSS REFERENCE TO RELATED APPLICATION

This application is a 371 of PCT/US03/00847 filed Jan. 13, 2003 which claims the benefit of U.S. provisional application Ser. No. 60/348,972, filed Jan. 15. 2002.

BACKGROUND OF THE INVENTION

1. Field of the Invention

The present invention relates to the art of forming products from particulate materials. More particularly, the present invention relates to the compaction of particulate materials. Still more particularly, the present invention relates to a new tool rig for the compaction of particulate materials.

2. Description of Related Art

In the manufacture of components or parts from particulate materials, a critical process is the compaction of the particulate material. Compaction is typically performed by filling a die cavity with the particulate material and applying pressure to the particulate material with a press.

The press has a driven main ram that moves in a single direction. The main ram is connected to a ram platen that moves with the main ram. In most cases, the main ram and ram platen move in a downward direction toward a base platen to perform the compaction. The main ram may be driven by hydraulic or mechanical means, as known to those skilled in the art. Depending on the operation, additional rams may be present to provide auxiliary motion in a coaxial direction.

For compaction different types of presses may be utilized, among them a hybrid press and a hydraulic press. A hydraulic press includes a hydraulically driven main ram and hydraulic auxiliary motions. A hybrid press comprises a crank or knuckle driven main ram and hydraulic auxiliary motions. Adjustable mechanical stops are used to prevent auxiliary motion beyond the desired range.

A density close to the theoretical density of the material is desired for a component made from a particulate material, because the mechanical properties of the component improve with increasing density of the compacted particulate. As a result, techniques have been developed to increase the density achieved through the compaction process. These techniques are often focused on multiple level parts, because the geometry of multiple level parts usually make uniform density distribution between the levels more difficult. A discrepancy in density distribution adversely affects the performance of the part and may lead to the formation of cracks in the compaction process.

One technique to improve compaction of multiple level parts is that of a tool rig comprising a die that defines a cavity in conjunction with at least two punches that extend into the cavity. At least one punch is typically actuated through auxiliary motion at some point during the compaction process to move the punch to a different vertical position and thereby direct the flow of the particulate material in the cavity to achieve a more uniform density distribution in the formed part. For parts with many levels, multiple punches may be used and each punch may be separately actuated.

In order to facilitate these actuated punches, designs of prior art tool rigs have relied upon cumbersome designs. A tool rig usually includes platens and/or cylinders to support each punch. Each of these support components must be independently movable to allow each punch to be independently actuated. Likewise, each support component must have an independent source of energy to create independent motion of the support component and its respective punch. Such sources of energy may include connections to hydraulic or pneumatic media. Further, each support component typically has a linear encoder that measures the position and travel of the component, in turn measuring the position and travel of the punch that the component supports.

The requirement of an independent energy supply source for each component that supports an actuated punch has necessitated the design of vertically long tool rigs and presses in the prior art. The vertical length of a press dictated by designs of the prior art is illustrated in European Patent No. EP 0 586 028 B1, issued to the present inventor and others; in PCT Publication No. WO 01/08864 A1, issued to Beane et al.; and in European Patent No. 0 077 897/related U.S. Pat. No. 4,482,307, issued to Schaidl et al. The excessive vertical length of these designs demands deep pits and/or high ceilings in a production facility, results in long tooling stack-ups that are difficult to align and increase set-up time, and yields a deflection that is generally high.

Accordingly, it is desirable to develop a new tool rig that integrates all necessary elements at a substantially reduced height, which provides increased rigidity and maintains good accessibility for set-up.

SUMMARY OF THE INVENTION

The present invention provides a tool rig for the compaction of particulate materials such as powdered metals, which includes a supply component to connect an energy supply to at least one piston from the inside of a piston.

In an exemplary embodiment of the present invention, a tool rig for the compaction of particulate materials includes a base and a cylinder block disposed on the base. At least two pistons are disposed within the cylinder block and one piston is at least partially disposed within one other piston. An energy supply is connected to at least one of the pistons from the inner diameter of a piston by means such as a supply component that defines a channel.

In another exemplary embodiment of the present invention, a tool rig for the compaction of particulate materials includes a base and a cylinder block disposed on the base. At least two pistons are disposed within the cylinder block and one piston is at least partially disposed within one other piston. A supply component is disposed in the inner diameter of at least one piston and defines at least two channels, wherein one channel provides an energy supply to one piston and one other channel provides an energy supply to one other piston.

In yet another exemplary embodiment of the present invention, a press for the compaction of particulate materials includes a frame and a tool rig for the compaction of particulate materials connected to the frame. The tool rig includes a base, a cylinder block disposed on the base and at least two pistons disposed within the cylinder block. One piston is at least partially disposed within one other piston and an energy supply is connected to at least one of the pistons by means such as a supply component. The supply component is disposed in the inner diameter of at least one of the pistons and defines at least one channel that provides connection to the energy supply.

BRIEF DESCRIPTION OF THE DRAWINGS

The invention may take form in certain components and structures, exemplary embodiments of which will be illustrated in the accompanying drawings, wherein.

DETAILED DESCRIPTION OF THE PREFERRED EMBODIMENTS

Figure 1:
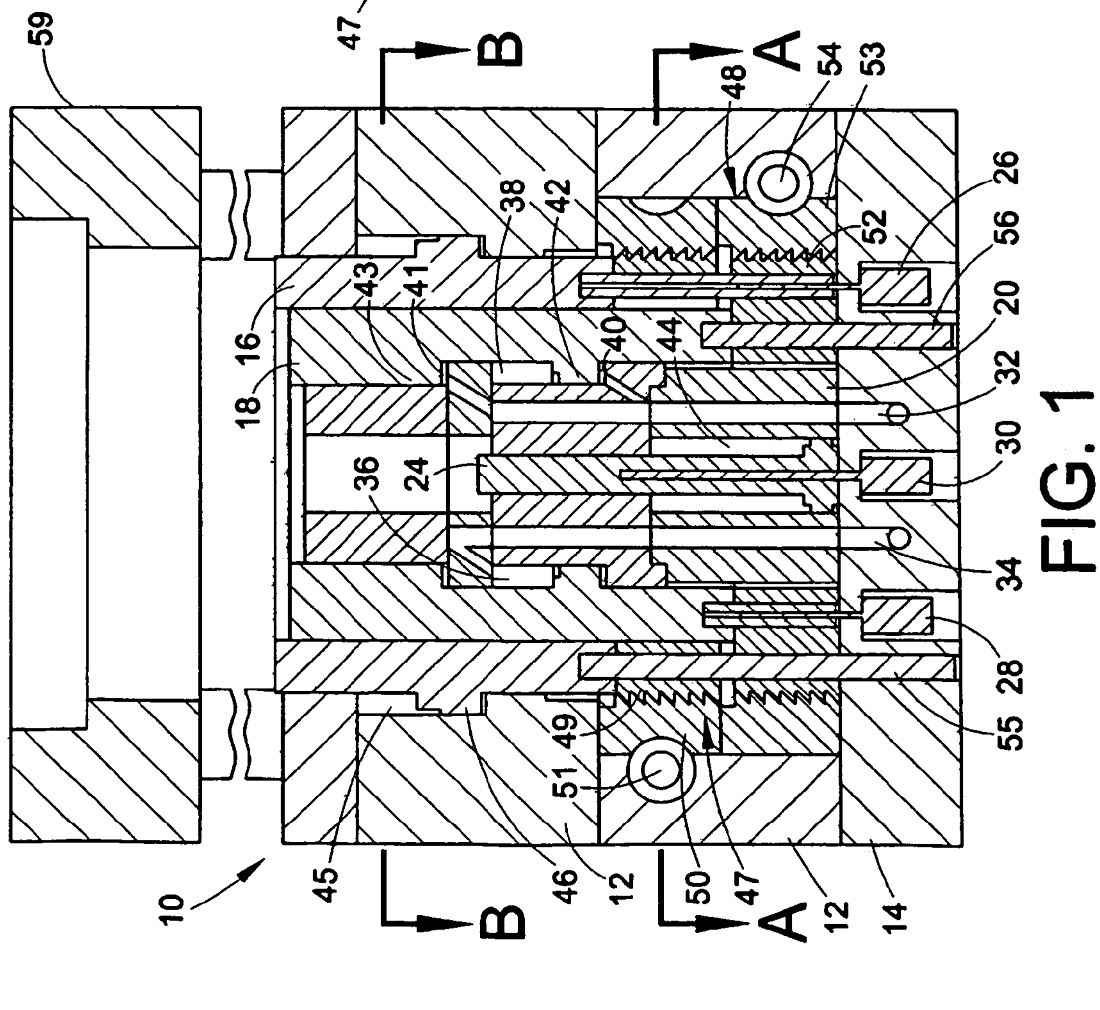
FIG. 1 is a front sectional view of a tool rig in accordance with an embodiment of the present invention.

With reference to FIGS. 1-4, a tool rig 10 to support tooling members is shown. Tooling members include punches, core rods and dies, as are required to form a part from particulate materials. Turning first to FIG. 1, the tool rig 10 includes a cylinder block 12 and a base 14. The cylinder block 12 and the base 14 may be collectively referred to as a housing. The tool rig 10 also includes a first, outer piston 16 and a second piston 18 inside of the first piston 16, each of which can support a separate tooling member movable along the vertical axis of the tool rig 10 in response to the supply of an energy source, such as hydraulic fluid. Means for connecting an energy source, such as a stationary supply component 20, are disposed in the inner diameter of the second piston 18. The energy source includes hydraulic or pneumatic pressure media.

A third, central piston 24 to actuate an additional tooling member may be disposed in the supply component 20. In the tool rig 10, the third piston 24 is at least partially on the same elevation as the second piston 18. That is, the height at which the lower limit of vertical travel of the third piston 24 occurs is at approximately the same height at which the lower limit of vertical travel of the second piston 18 occurs. It is to be noted that the supply component 20 may be an integral part of the housing 12 and 14 of the tool rig 10. As a result, the cylinder block 12, the base 14 and the supply component 20 cooperate to contain, support and supply an energy source to the movable pistons 16, 18 and 24.

The supply component 20 allows an energy supply to be connected to the second piston 18 from the interior of the second piston 18, as well as to the third piston 24. The base 14 houses a linear encoder 26 for the first piston 16, a linear encoder 28 for the second piston 18 and a linear encoder 30 for the third piston 24.

A first channel 32 and a second channel 34 are defined in the base 14 of the tool rig 10 and continue through the supply component 20 for the connection of an energy supply, such as hydraulic fluid, to the second piston 18. A first annular pocket 36 is defined between the second piston 18 and the supply component 20. The first pocket 36 includes an upper portion 38 and a lower portion 40. A second, higher, annular pocket 41 is also defined between the second piston 18 and the supply component 20. The second piston 18 includes a first radial projection 42 about its inner circumference that rides within the first pocket 36 and a second radial projection 43 that forms the upper wall of the second pocket 41. The first channel 32 supplies hydraulic fluid to the lower portion 40 of the first pocket 36 and to the second pocket 41 to urge both projections 42 and 43, and hence the second piston 18, upward. The second channel 34 supplies the upper portion 38 of the first pocket 36 with hydraulic fluid to urge the projection 42, and thus the second piston 18, downward. In this manner, the travel of the tooling member supported by the second piston 18 is controlled.

A third annular pocket 44 is defined in between the supply component 20 and the third piston 24. Hydraulic fluid is supplied to the third pocket 44 through channels (57 and 58 in FIG. 2) in the supply component 20 to control the movement of the third piston 24, and the tooling member that it supports, in the manner described for the second piston 18.

With continuing reference to FIG. 1, a fourth annular pocket 45 is defined between the cylinder block 12 and the first piston 16. A radial projection 46 extends about the outer circumference of the first piston 16 and rides within the fourth pocket 45. The hydraulic fluid is supplied to the fourth pocket 45 through channels (not shown) in the outer wall of the cylinder block 12 to control the movement of the projection 46, and thus the first piston 16 and the tooling member that it supports.

Upper and lower adjustable mechanical stops 47 and 48 may be included in the tool rig 10 to allow the first piston 16 and the second piston 18 to have an adjustable lower limit of movement. The upper adjustable stop 47 includes a first inner ring 49 having an external thread that connects to an internal thread of a first outer ring 50. The first outer ring 50 may be rotated by a first worm gear shaft 51. Likewise, the lower adjustable stop 48 includes a second inner ring 52 that has an external thread that connects to an internal thread of a second outer ring 53, which in turn may be rotated by a second worm gear shaft 54. A first guide rod 55 and a second guide rod 56 are fixed to the first and second pistons 16 and 18, respectively, and are guided in the base 14 to keep the inner rings 49 and 52 from rotating. Therefore, if the outer rings 50 and 53 are rotated, the respective inner rings 49 and 52 will be moved vertically and will thus change the lower limit of movement for the pistons 16 and 18. It is also to be noted that adjustable mechanical stops using threaded rings, as described, are provided by way of example only, as other adjustment mechanisms known in the art, such as wedges, may be used.

Figure 2:
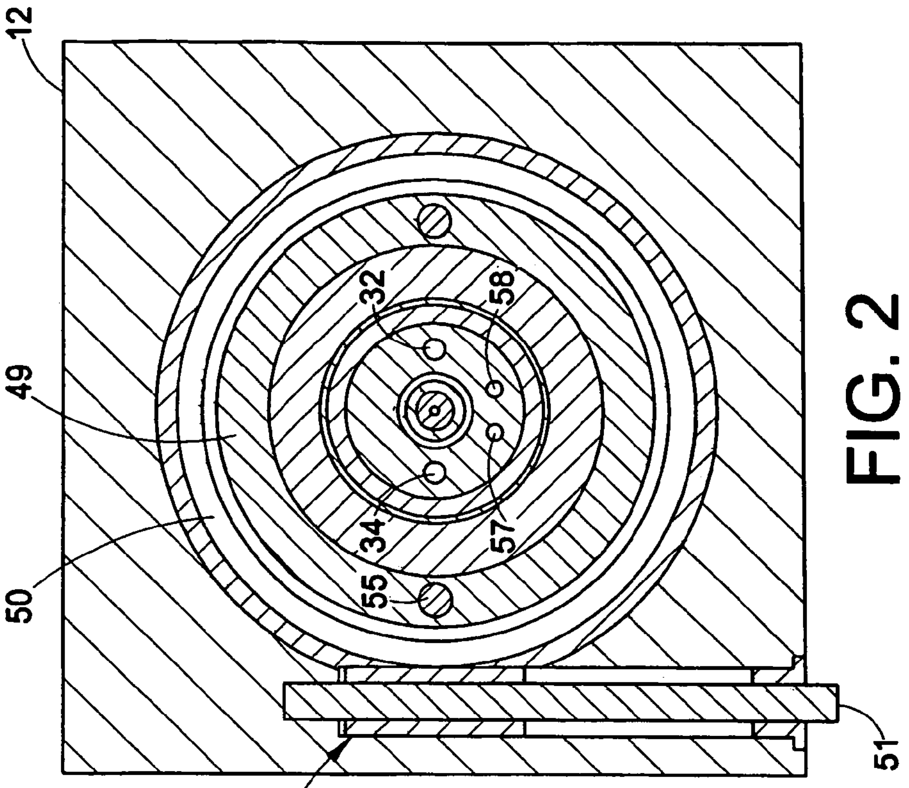
FIG. 2 is a plan sectional view of the tool rig of FIG. 1 along line A-A.

FIG. 2 illustrates the base 14 of the tool rig 10 from a plan sectional view. The detail of the upper mechanical stop 47, which supports the first piston 16, can be seen. In particular, the first worm gear shaft 51 that drives the rotation of the first outer ring 50 and the first guide rod 55 that prevents rotation of the inner ring 49 are apparent.

FIG. 2 further illustrates the first and second supply channels 32 and 34 defined by the supply component 20 for the actuation of the second piston 18 (referring back to FIG. 1) and the third and fourth supply channels 57 and 58 also defined by the supply component 20 for the actuation of the third piston 24.

Figure 4:
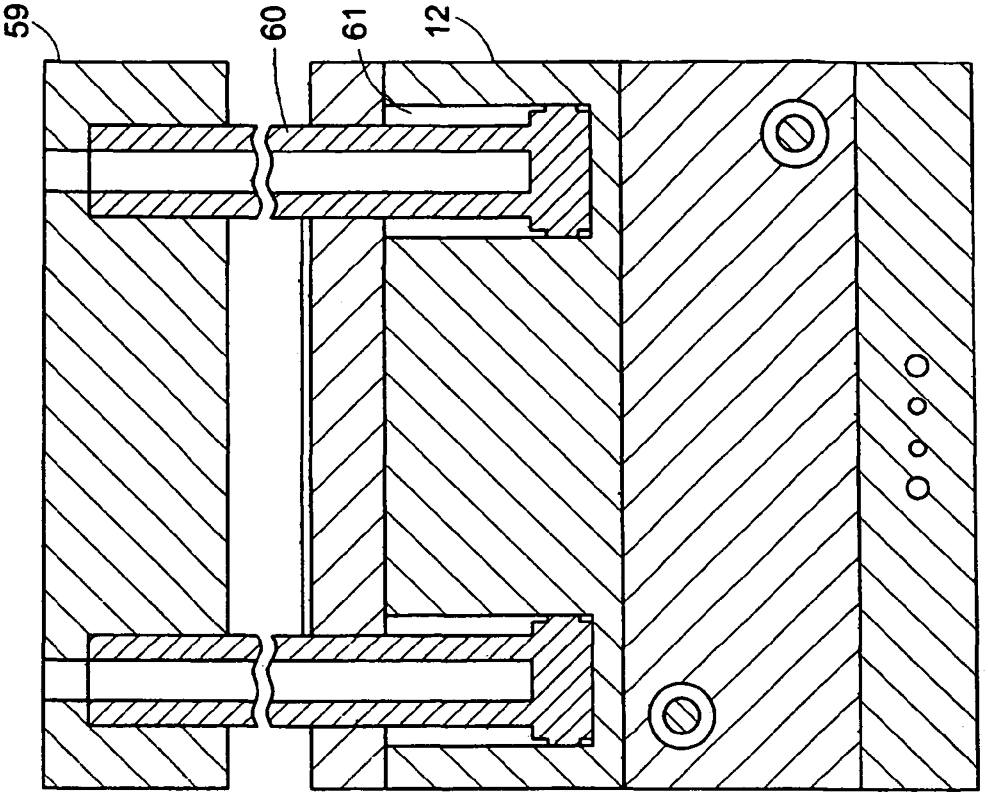
FIG. 4 is a sectional view of the tool rig of FIG. 3 taken along line C-C.
Figure 3:
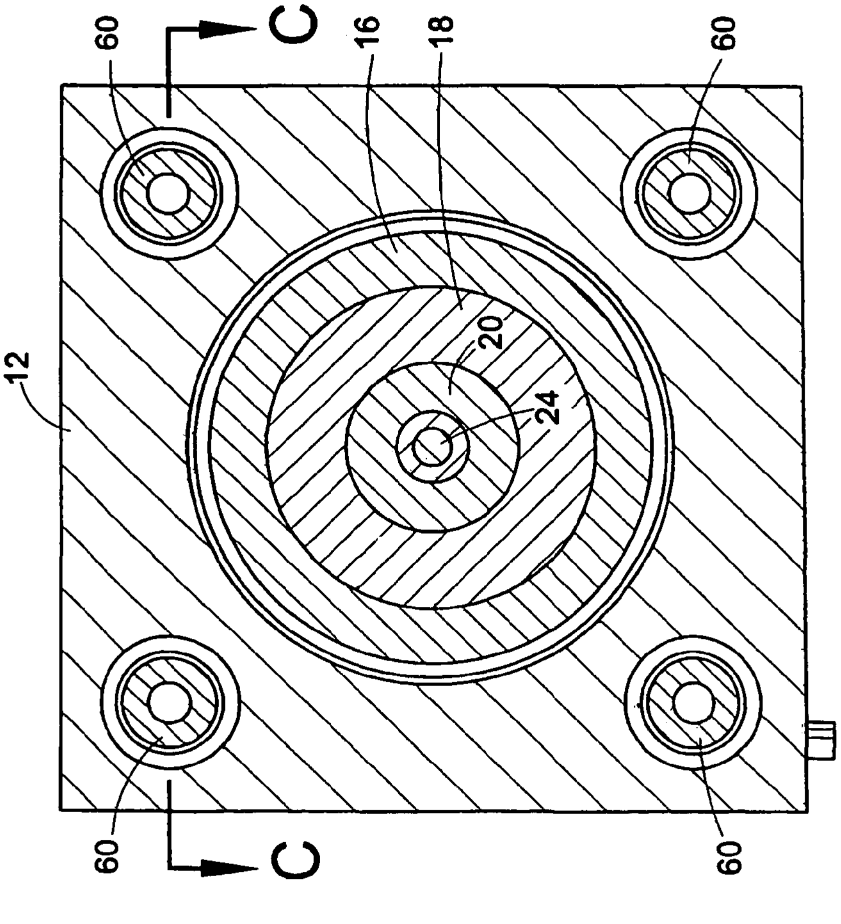
FIG. 3 is a plan sectional view of the tool rig of FIG. 1 along line B-B.

With reference to FIG. 3, the concentric relationship between the first piston 16, the second piston 18, the supply component 20 and the third piston 24 in the cylinder block 12 is further illustrated. A die platen 59 (referring back to FIG. 1) includes connecting lateral pistons 60 that extend into the cylinder block 12. Additional detail of the interaction between the cylinder block 12 and the connecting lateral pistons 60 is shown in FIG. 4. The connecting lateral pistons 60 extend into corresponding chambers 61 defined in the cylinder block 12. Typically, two (2) or four (4) connecting lateral pistons 60 are present.

Figure 6:
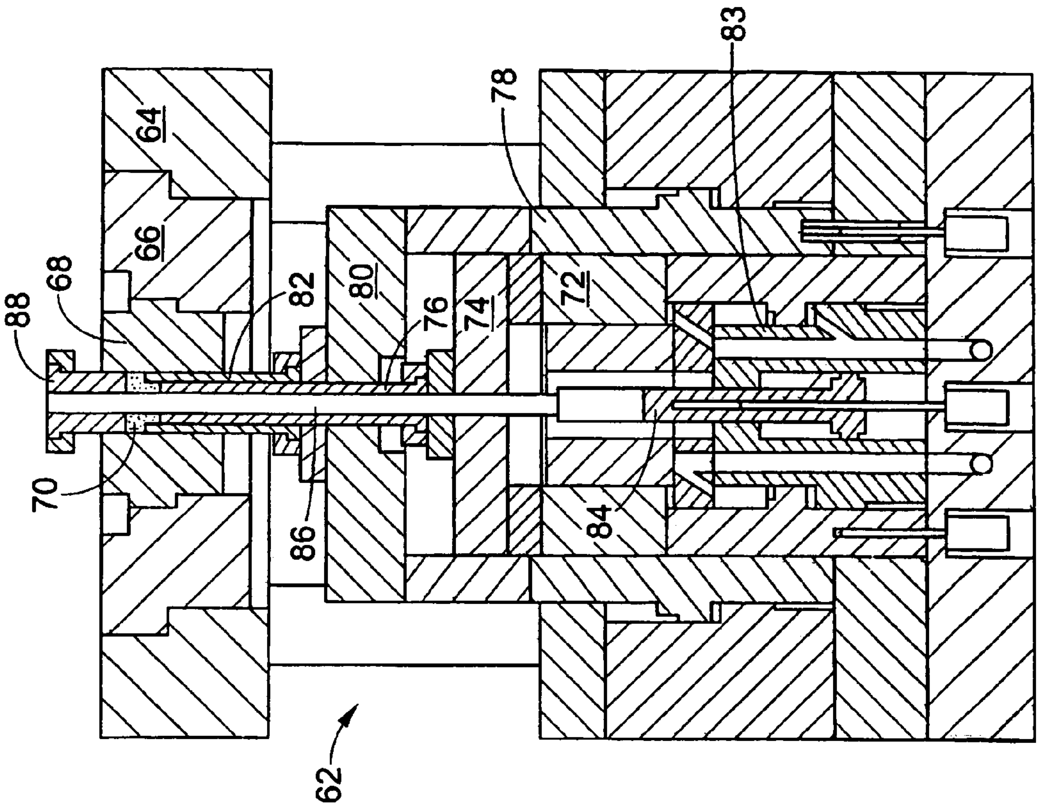
FIG. 6 is a front sectional view of the tool rig of FIG. 5 in a compacting position.
Figure 5:
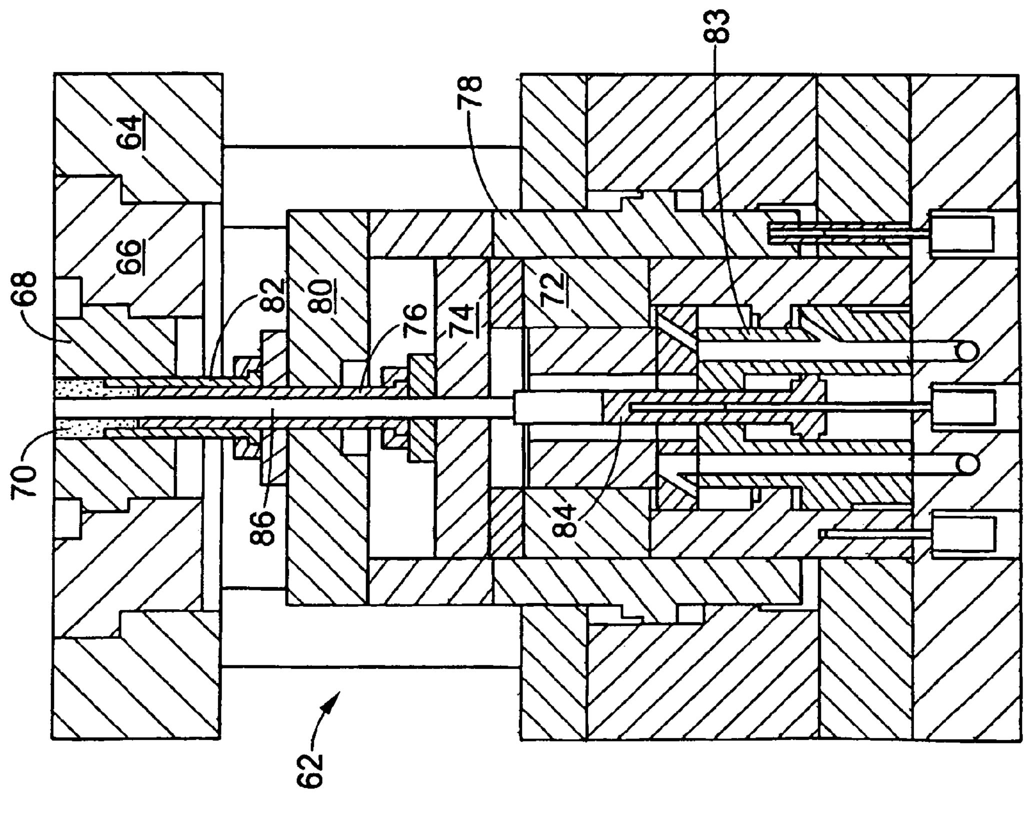
FIG. 5 is a front sectional view of a tool rig in accordance with another embodiment of the present invention in a fill position.
Figure 7:
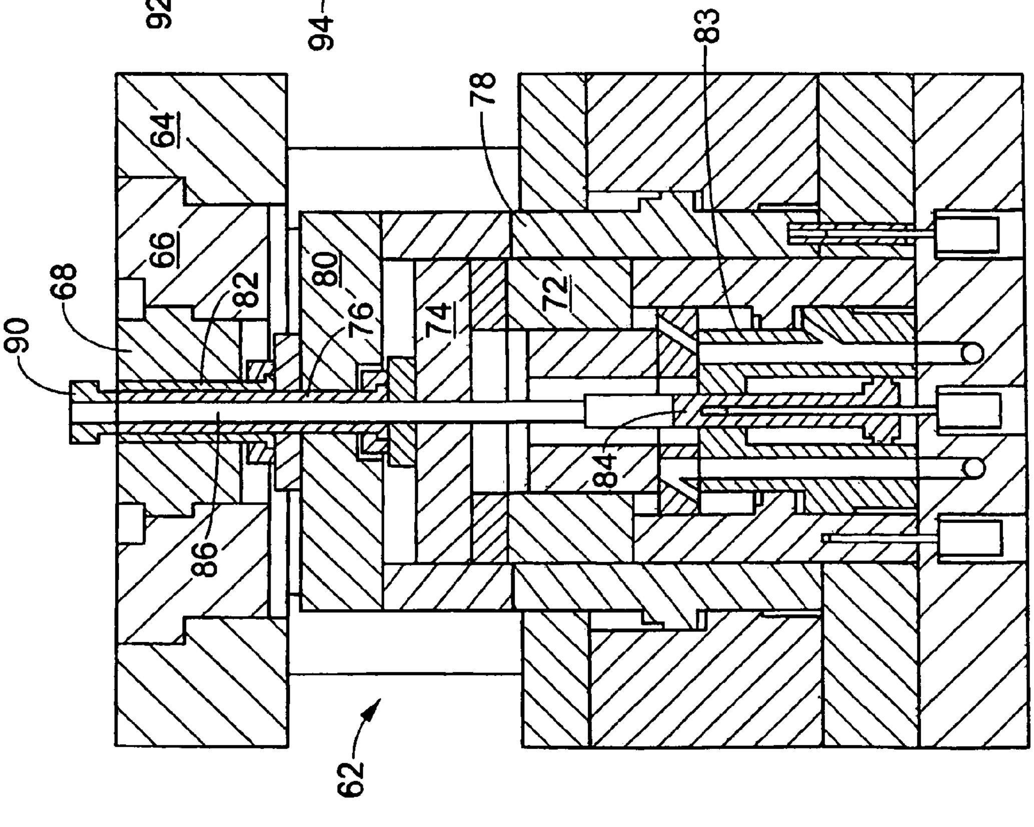
FIG. 7 is a front sectional view of the tool rig of FIG. 5 in an ejection position.

Turning now to FIGS. 5-7, actuation of a similar, yet alternative, embodiment of a tool rig 62 is illustrated. The tool rig 62 is similar to the tool rig 10 described in FIGS. 1-4, without an adjustable mechanical stop. In place of adjustable mechanical stops are simple positive stops. FIG. 5 shows the tool rig 62 in a fill position. The tool rig 62 may include a die platen 64 that houses a die adapter 66. The die adapter 66 receives a die 68 that defines a cavity 70, which holds the particulate material or pre-form that is compacted by use of the tool rig 62. On top of a second piston 72 is an adapter 74 that facilitates the support of an inner punch 76 by the second piston 72. Surrounding the second piston 72 is a first piston 78. The first piston 78 supports an adapter 80, which in turn supports an outer punch 82. This system of pistons 72 and 78 and adapters 74 and 80 allows the outer punch 82 and the inner punch 76 to extend into the cavity 70 when the tool rig 62 is in the fill position. Disposed in the center of the supply component 83 is a third piston 84 that actuates a core rod 86 that extends into the cavity 70.

With reference to FIG. 6, an upper punch 88 may have entered the cavity 70 when the tool rig 62 is in a compaction position. FIG. 7 illustrates the tool rig 62 in an ejection position, where a compacted part 90 is pushed out of the die 68 by the punches 76 and 82. The fill-compaction-ejection cycle shown in FIGS. 5-7 illustrates the movement of the concentric pistons 72, 78 and 84, which remain on essentially the same level or elevation throughout their operation, facilitated by the supply component 83.

Figure 8:
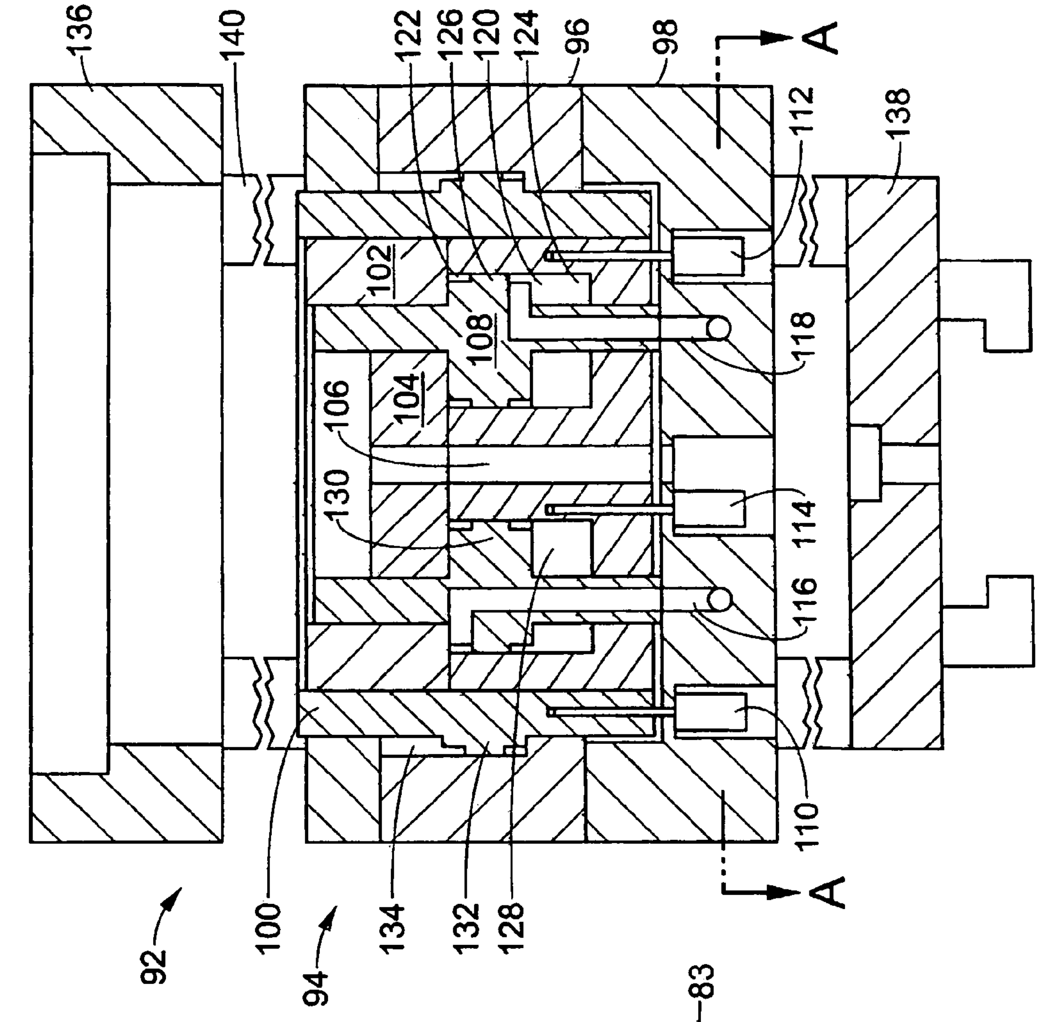
FIG. 8 is a front sectional view of a lower half of a tool rig in accordance with yet another embodiment of the present invention.
Figure 10:
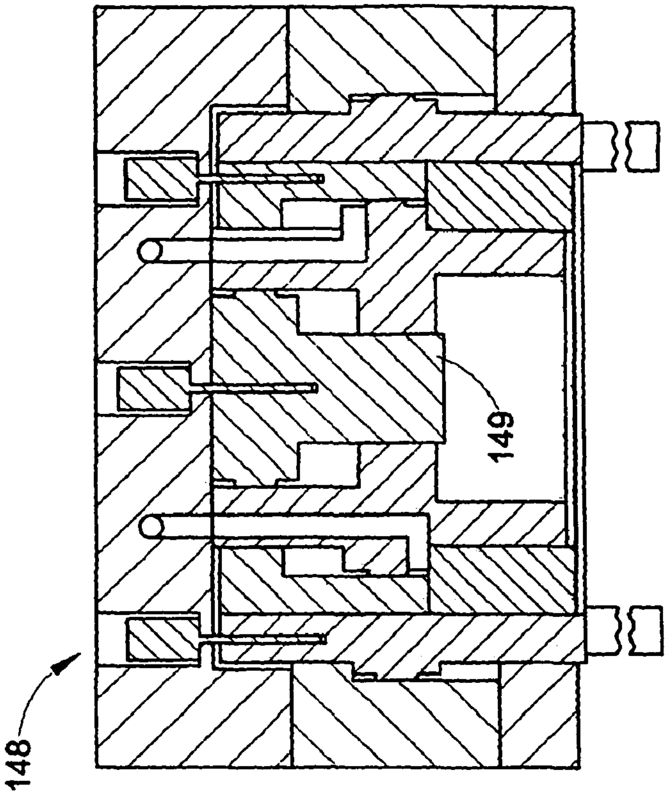
FIG. 10 is a front sectional view of an upper half of a tool rig in accordance with the embodiment FIG. 8.
Figure 9:
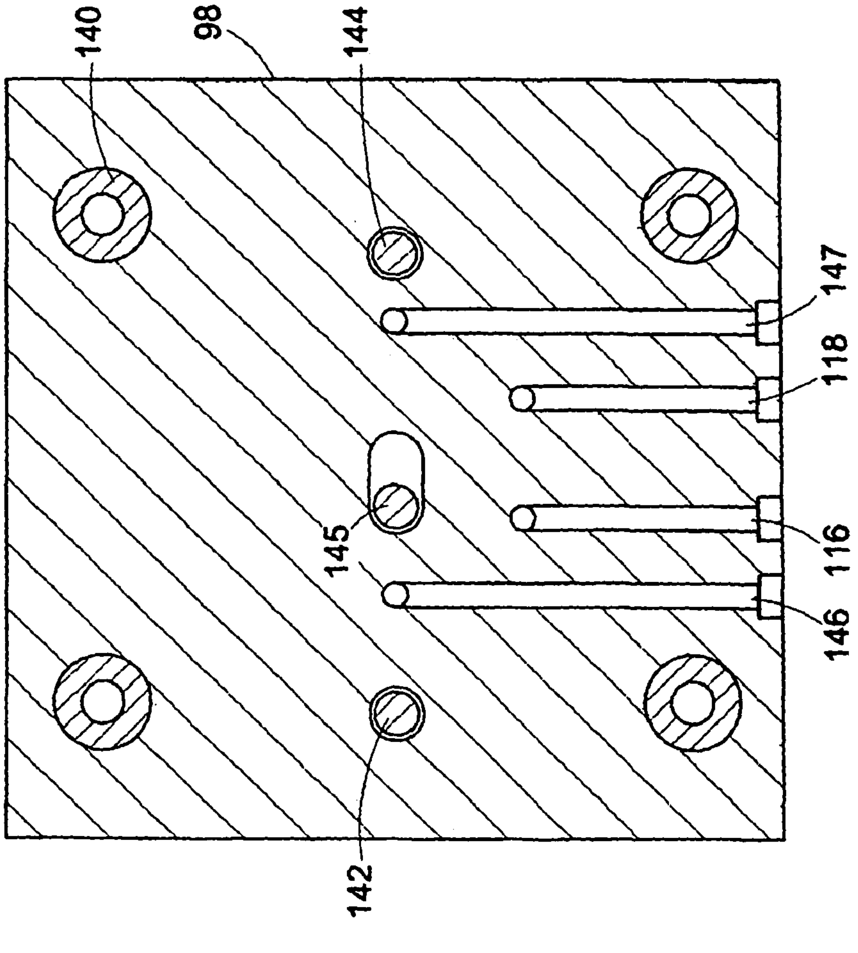
FIG. 9 is a plan sectional view of the tool rig of FIG. 8 taken along line A-A.

Turning to FIGS. 8-10, yet another embodiment of a tool rig 92, designed to support three upper and three lower tooling members, is shown. With reference to FIG. 8, the tool rig 92 includes a lower half 94. The lower half 94 of the tool rig 92 includes a cylinder block 96 and a base 98. Housed within the cylinder block 96 are a first, outer concentric piston 100; a second, middle concentric piston 102; and a third, inner concentric piston 104. These pistons 100, 102 and 104 provide support for the lower tooling members (not shown) and are movable along the vertical axis of the tool rig 92 in response to the supply of an energy source, such as hydraulic fluid. A central bore 106 for an externally operated central tooling member (not shown) is defined in the inner diameter of the third piston 104. Disposed between the second piston 102 and the third piston 104 is a stationary supply component 108. The supply component 108 allows access to the second piston 102 and the third piston 104 for the supply of the energy source from a lateral position between the pistons 102 and 104.

Housed within the base 98 of the lower half 94 of the tool rig 92 are linear encoders. A linear encoder 110 for the first piston 100, a linear encoder 112 for the second piston 102 and a linear encoder 114 for the third piston 104 are all mounted within the base 98. The encoders 110, 112 and 114 extend from the base 98 into each respective piston 100, 102 and 104 and measure the travel of each respective piston 100, 102 and 104 throughout the compaction cycle.

The base 98 also defines supply channels that facilitate the connection of an energy supply, such as hydraulic fluid. For example, an upper supply channel 116 and a lower supply channel 118 are defined in the base 98 of the tool rig 92 and continue into the supply component 108. A first annular pocket 120 is defined by the second piston 102 and includes an upper portion 122 and a lower portion 124. The supply component 108 includes a first radial projection 126 that extends into the first pocket 120 to create the limits of vertical travel for the second piston 102. The lower channel 118 supplies the hydraulic fluid to the lower portion 124 of the first pocket 120 to urge the second piston 102 upward. The upper channel 116 supplies the upper portion 122 of the pocket 120 with hydraulic fluid to urge the second piston 102 downward.

The third piston 104 defines a second annular pocket 128 into which a second radial projection 130 from the supply component 108 extends. Thus, the third piston 104 may also be supplied with an energy source, such as hydraulic fluid, to cause vertical movement, as described above for the second piston 102.

The first piston 100 includes a third radial projection 132 about its outer circumference that rides within a third annular pocket 134 defined in the cylinder block 96. The third pocket 134 for the first piston 100 is connected to the energy supply through a channel (not shown) defined in the cylinder block 96, typically through the outer wall of the cylinder block 96. As with the second 102 and the third 104 pistons, the limits of the third projection 132 in the third pocket 134 within which it rides dictate the travel of the first piston 100 and the tooling member it supports.

A die platen 136 is tied to a connecting plate 138 by columns 140, which pass through the cylinder block 96 and the base 98. The connecting plate 138 in turn ties to an external drive provided by the press (not shown).

Turning now to FIG. 9, a plan sectional view of the base 98 of the lower half 94 of the tool rig 92 is illustrated. A port 142 for the linear encoder 110 of the first piston 100 is defined in the base 98, as are ports 144 and 145, for the encoders 112 and 114 of the second piston 102 and the third piston 104, respectively. The energy supply channels 116 and 118 for the second piston 102 and energy supply channels 146 and 147 for the third cylinder 104 are shown. The location of the columns 140 that tie the die platen 136 to the connecting plate 138 (referring back to FIG. 8) are also shown.

Depending upon the particular application, it may be desirable to actuate multiple punches from a position above the die platen 136 (referring back to FIG. 8) in addition to a position below the platen 136. When multiple punches are used above the platen 136, the tool rig 92 may include an upper half 148, shown in FIG. 10. The upper half 148 of the tool rig 92 is located above the die platen 136 and is substantially a mirror image of the lower half 94 that is located below the die platen 136. Due to such similarity, the upper half 148 will be understood based upon the foregoing description of the lower half 94. Of particular note is a third, central piston 149 similar to the central piston 104 of the lower half 94, except the central piston 149 of the upper half 148 does not have a central bore. Of course, any embodiment of the tool rig described herein may include an upper half in addition to a lower half. Also, an upper half or a lower half of the tool rig of the present invention may be combined with a respective lower or upper half of a tool rig of the prior art.

Figure 11:
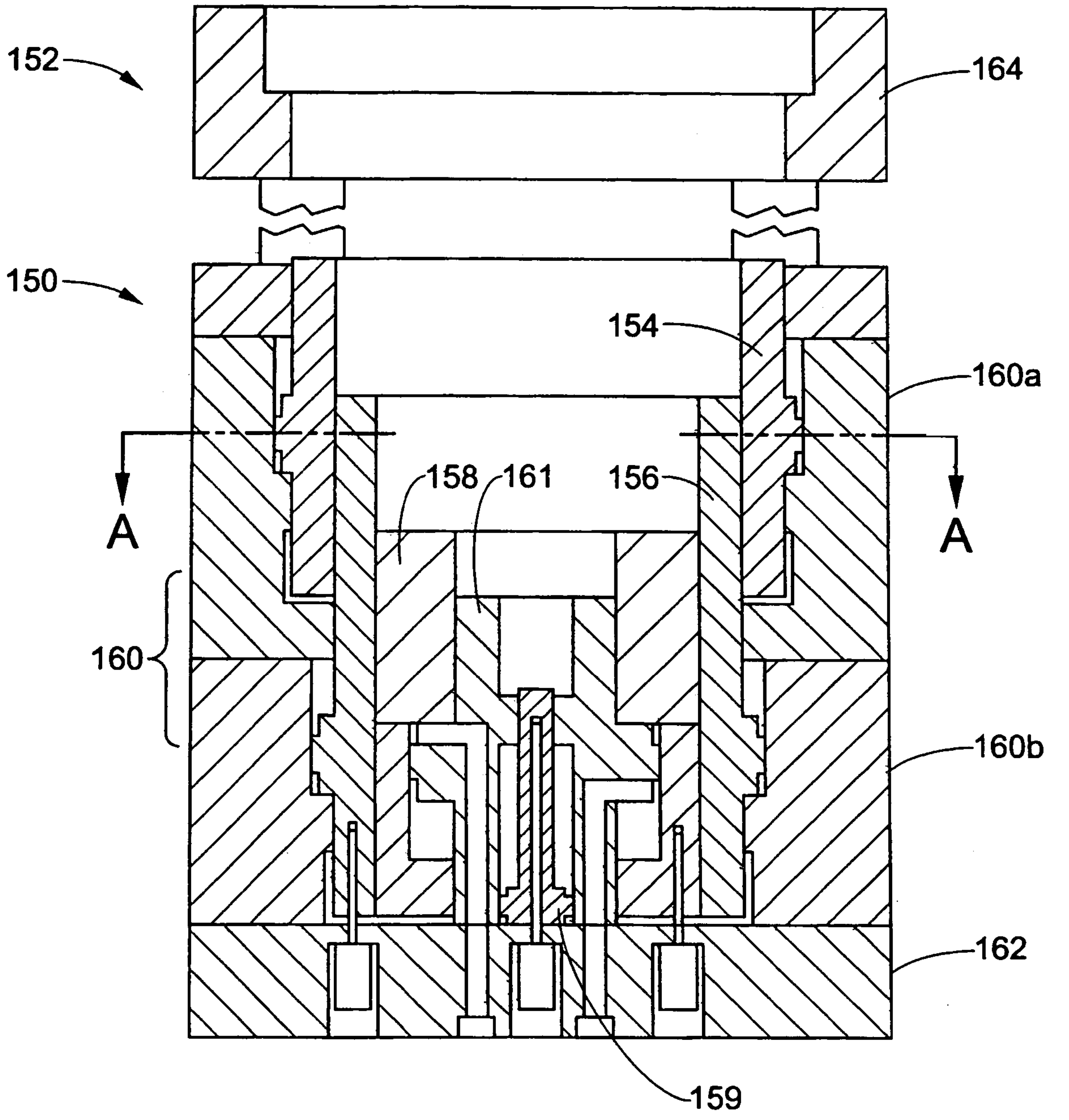
FIG. 11 is a front sectional view of a tool rig in accordance with still another embodiment of the present invention.
Figure 12:
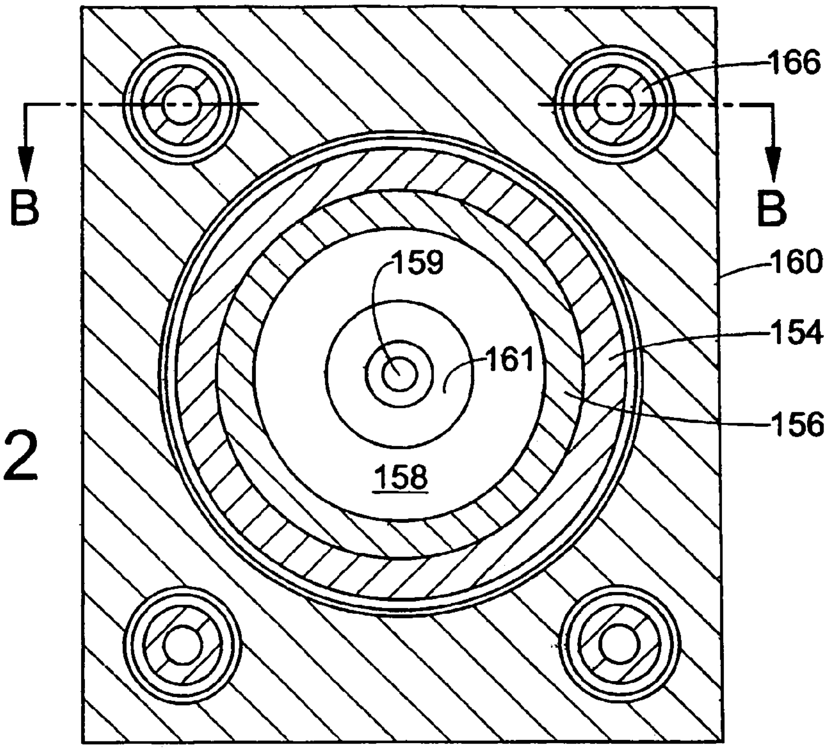
FIG. 12 is a plan sectional view of the tool rig of FIG. 11 taken along line A-A.
Figure 13:
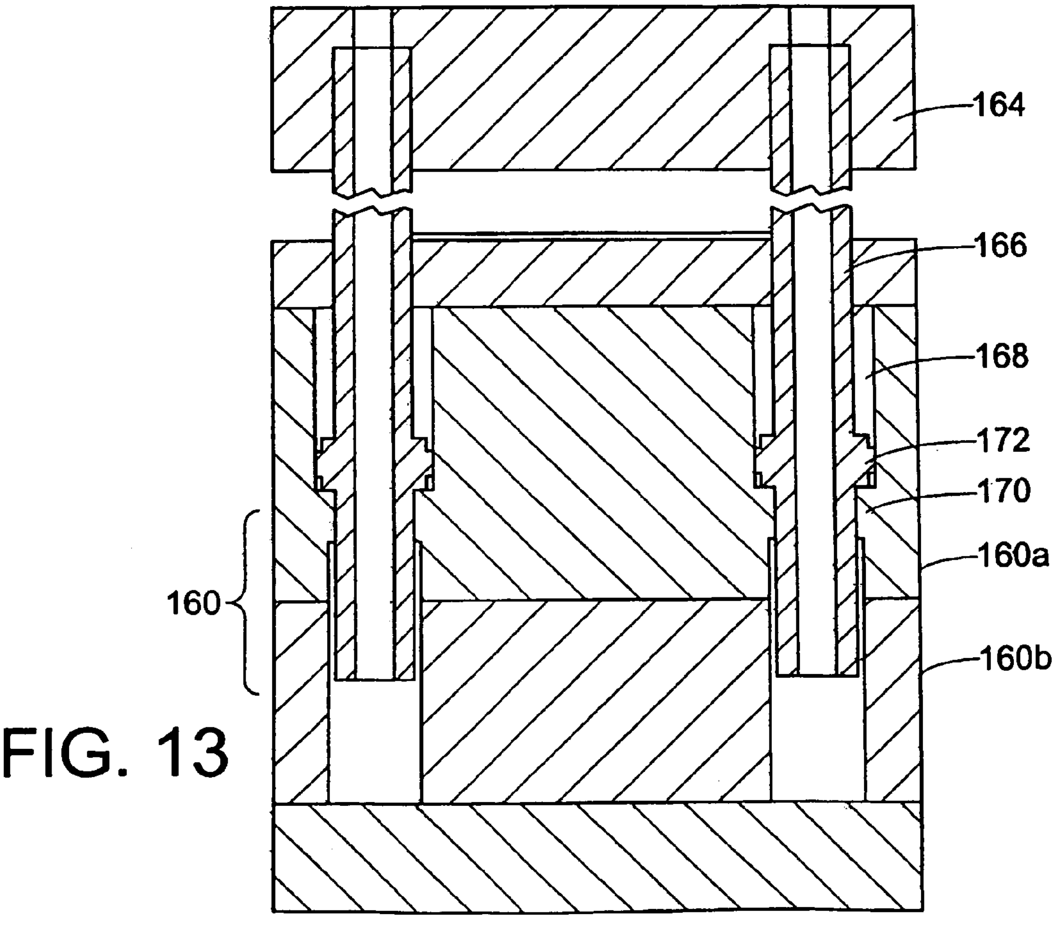
FIG. 13 is a sectional view of the tool rig of FIG. 12 taken along line B-B.

With reference to FIGS. 11-13, a lower half 150 of still another embodiment of a tool rig 152 is shown. In this embodiment, a first concentric piston 154, a second concentric piston 156, a third concentric piston 158 and a fourth concentric piston 159 are present. However, a cylinder block 160 that houses the pistons 154, 156, 158 and 159 is extended vertically (as compared to the prior embodiments) and includes a top cylinder block portion 160*a* and a bottom cylinder block portion 160*b*. In addition, a supply component 161 is disposed within the inner diameter of the third piston 158. As a result, the third piston 158 and the fourth piston 159 are supplied from a base 162 of the tool rig 152 through the supply component 161, as described in the above embodiments. Both the first and second cylinders 154 and 156 are supplied through the outer wall of the cylinder block 160, i.e., the first piston 154 is supplied through the outer wall of the upper cylinder block portion 160*a* and the second piston 156 is supplied through the outer wall of the lower cylinder block portion 160*b*.

In this manner, only some of the pistons, i.e., the second, third and fourth pistons 156, 158 and 159, may be on one level, while one or more pistons, such as the first piston 154, is on a different level. In such an embodiment, the overall length of the tool rig 152 is not substantially increased from that of the prior embodiments, as more than one piston (i.e., 156, 158 and 159) are on the same level and tool adaptation for the tooling members supported by these pistons may be at least partially on the level of the first piston 154, thereby decreasing the minimum gap required between a die platen 164 and the cylinder block 160.

As shown in FIGS. 12 and 13, the die platen 164 may include connecting lateral pistons 166 that extend into the lower half 150 of the tool rig 152, similar to the manner described above in FIG. 4. The cylinder block 160 defines chambers 168 into which the corresponding connecting lateral pistons 166 extend. The cylinder block 160 also defines a shoulder 170 that extends into each chamber 168, which cooperates with a flange 172 on each connecting lateral piston 166 to define the lower limit of vertical travel of the connecting lateral pistons 166, and hence, the die platen 164.

The use of the supply component reduces the excessive height required for a press that compacts parts made from particulate materials using multiple punches. This reduces the deflection of the press and the tooling stack-up, and also eases the alignment of the tooling members, thereby increasing the quality of the parts made. In addition, the press occupies less vertical production space.

The above examples have described in detail a tool rig in a modular design to allow multiple rigs to be interchangeably used on a single press. However, it is also anticipated that a press may be designed with the tool rig of the present invention as an integral component. A press that may utilize the tool rig either as a modular unit or as an integral component includes a frame. The frame may provide main ram motion, actuation of the die and further tooling members, and electric, hydraulic or pneumatic controls.

Particular note is made that at least two concentric pistons of the tool rig of the present invention are at essentially the same level or elevation. Further, a base that is on a different level contains encoders and means to provide an energy supply to each concentric piston. The invention has been illustrated with respect to a tool rig that supports three or four tooling members, such as punches or core rods and a die. However, support of more punches or core rods may be accomplished using the design of the present invention. For example, five or six concentric cylinders may be employed, rather than three or four.

The invention has been described with reference to the preferred embodiments. Of course, modifications and alterations might occur to others upon reading and understanding the preceding detailed description. It is intended that the invention be construed as including all such modifications and alterations insofar as they come within the scope of this disclosure.

Having thus described the invention, what is claimed is:

1. A tool rig for the compaction of particulate materials, comprising:

a base;

a cylinder block disposed on the base;

first and second pistons disposed within the cylinder block, the second piston being at least partially disposed within the first piston; and first and second supply means for connecting an energy supply to the second piston from positions within the second piston to cause the second piston to move independently from movement of the first piston, the first supply means causing the second piston to move in a first direction and the second supply means causing the second piston to move in a second direction opposite the first direction.

2. The tool rig of claim 1, wherein the first and second supply means respectively include first and second channels defined by a supply component at least partially disposed within the second piston.

3. The tool rig of claim 2, wherein the supply component is stationary relative to the base.

4. The tool rig of claim 2, wherein the first and second channels extend through the base.

5. The tool rig of claim 2, wherein the supply component defines a central bore.

6. The tool rig of claim 5, further comprising:

a third piston disposed within the central bore; and third supply means for connecting an energy supply to the third piston from a position within the second piston to cause the third piston to move independently from movement of the first and second pistons.

7. The tool rig of claim 1, wherein the first and second pistons are concentric.

8. The tool rig of claim 1, further comprising at least two connecting lateral pistons at least partially contained within the cylinder block, to connect at least one platen to the cylinder block.

9. The tool rig of claim 1, further comprising at least one linear encoder disposed in the base.

10. The tool rig of claim 1, further comprising a mechanical stop for at least one of the pistons.

11. The tool rig of claim 10, wherein the mechanical stop is adjustable.

12. The tool rig of claim 11, wherein the mechanical stop includes an inner ring with an external thread that connects to an internal thread of an outer ring, whereby the stop is adjusted by rotation of the outer ring.

13. A tool rig for the compaction of particulate materials, comprising:

a base;

a cylinder block disposed on the base;

first and second pistons disposed within the cylinder block, the second piston being at least partially disposed within the first piston; and a supply component disposed in the second piston, the supply component defining first and second channels providing an energy supply causing the second piston to move independently from movement of the first piston, the first channel providing an energy supply causing the second piston to move in a first direction and the second channel providing an energy supply causing the second piston to move in a second direction opposite the first direction.

14. The tool rig of claim 13, wherein the first and second pistons are on essentially the same level.

15. The tool rig of claim 13, further comprising a third piston, wherein two of the three pistons are on essentially the same level and one of the three pistons is on a different level from the two pistons that are on essentially the same level.

16. The tool rig of claim 13, wherein the supply component defines a central bore.

17. The tool rig of claim 16, further comprising a third piston disposed within the central bore.

18. The tool rig of claim 17, further comprising supply means for connecting an energy supply to the third piston from a position within the second piston to cause the third piston to move independently from movement of the first and second pistons.

19. The tool rig of claim 13, further comprising at least one linear encoder disposed in the base.

20. The tool rig of claim 13, further comprising a mechanical stop for at least one of the pistons.

21. The tool rig of claim 20, wherein the mechanical stop is adjustable.

22. The tool rig of claim 21, wherein the mechanical stop includes an inner ring and an outer ring, whereby the stop is adjusted by rotation of the outer ring.

23. A press for the compaction of particulate materials, comprising:

a frame; and a tool rig for the compaction of particulate materials connected to the frame, including a base, a cylinder block disposed on the base, first and second pistons disposed within the cylinder block, the second piston being at least partially disposed within the first piston, and first and second supply means for connecting an energy supply to the second piston from positions within the second piston to cause the second piston to move independently from movement of the first piston, the first supply means causing the second piston to move in a first direction and the second supply means causing the second piston to move in a second direction opposite the first direction.

24. The press for the compaction of particulate materials of claim 23, wherein the first and second supply means respectively include first and second channels defined by a supply component at least partially disposed within the second piston.

25. The press for the compaction of particulate materials of claim 23, wherein the tool rig is integrally connected to the frame.

26. The press for the compaction of particulate materials of claim 23, wherein the tool rig is removably connected to the frame.

27. The press for the compaction of particulate materials of claim 23, further comprising electric controls.

28. The press for the compaction of particulate materials of claim 23, further comprising hydraulic controls.

29. The press for the compaction of particulate materials of claim 23, further comprising pneumatic controls.

* * * * *